M. RANDOLPH.
APPARATUS FOR ELEVATING AND CONVEYING GRAIN IN BULK.
No. 182,226. Patented Sept. 12, 1876.
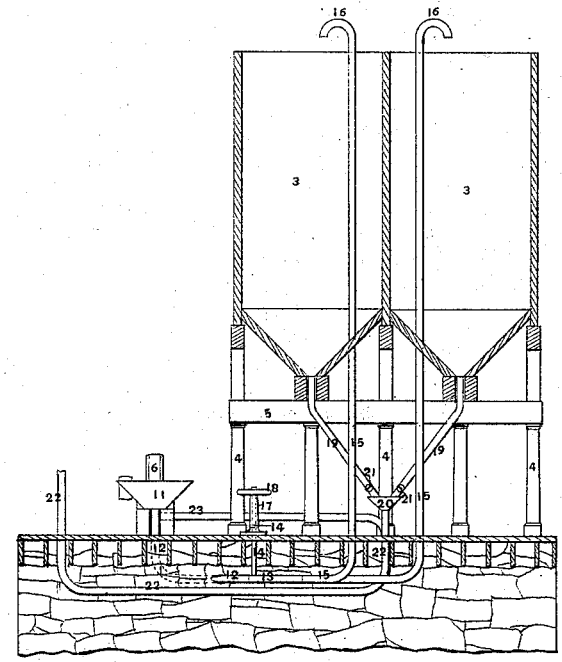
FIG 1
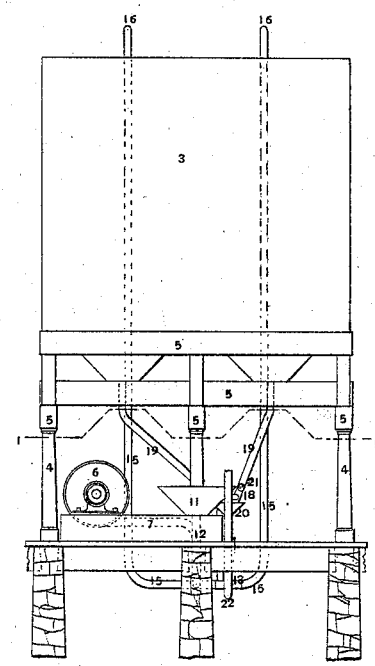
FIG 2
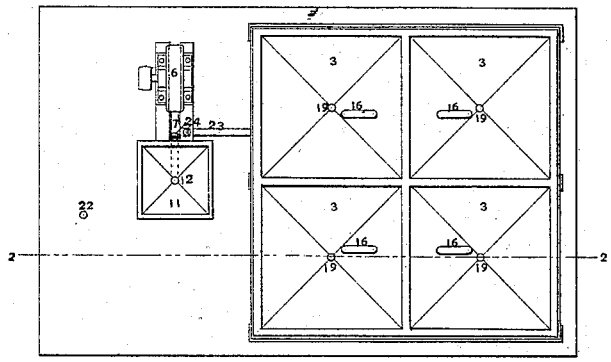
FIG 3
FIG 5
FIG 6
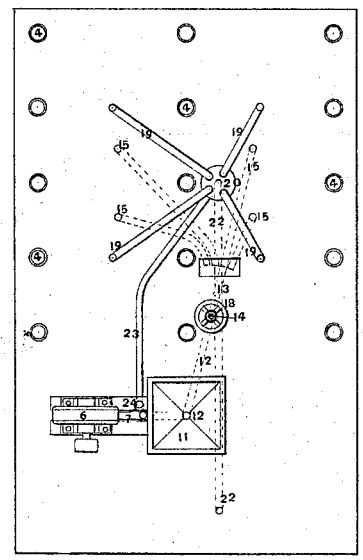
FIG 4
WITNESSES
INVENTOR
Mahlon Randolph

UNITED STATES PATENT OFFICE.

MAHLON RANDOLPH, OF NEW YORK, N. Y.

IMPROVEMENT IN APPARATUS FOR ELEVATING AND CONVEYING GRAIN IN BULK.

Specification forming part of Letters Patent No. 182,226, dated September 12, 1876; application filed June 10, 1875.

*To all whom it may concern:*

Be it known that I, MAHLON RANDOLPH, of the city, county, and State of New York, have invented a new and useful Improvement in Apparatus for Elevating and Conveying Grain in Bulk; and I do hereby declare the following to be the specification of the same:

This invention relates to a system of conveying grain in pipes by means of an annular air-blast, and to the apparatus for producing the desired result.

The air-blast is delivered to the conveying or elevating pipe in an annular sheet, concentric with the pipe, and the grain to be moved is delivered into the interior of the air-blast, and moves along with it without touching the pipe very much, and the friction produced is only that afforded by the contact of the air with the pipe.

It is preferable that the annular air-blast shall be delivered in the grain-pipe in spiral rather than in rectilinear lines, as the annular form of the blast will thereby be better maintained in the pipe, and the air-blast can also be made to more fully envelop the moving column of grain as the induction-current of grain would break the annular form of the blast were it delivered in rectilinear lines; but with the spiral direction the air-current will easily pass around the point of the pipe where the grain first impinges upon it, and a little farther on the air-current will fully envelop the moving column of grain within it.

The system of piping laid within a building is such that one air-blast will serve to drive the grain into any desired number of bins by an arrangement of switches for the pipes, and the same air-blast may be used for both the receiving and shipping pipes of the establishment. The pipes may extend any desired distance, either in a horizontal or a vertical direction, and therefore the building in which they are used may be remote from the vessel or car into which the grain is to be shipped, or from which it is to be received.

The invention will be readily understood by reference to the accompanying drawings, of which—

Figure 1 is a sectional elevation of the bins of a grain-warehouse, taken on the line 2 2 of Fig. 3, showing, in connection therewith, a series of pipes and forcing apparatus for moving the grain into and out of the bins. Fig. 2 is a side elevation of the same. Fig. 3 is a general plan of the same. Fig. 4 is a sectional plan of the warehouse and grain-moving pipes, taken on the line 1 1 of Fig. 2. Fig. 5 is a longitudinal section of a portion of the air-forcing pipe. Fig. 6 is a transverse section of a portion of the air-forcing pipe.

The bins 3 may be constructed in any of the usual or approved forms, and of any desired material, as this invention has only to do with the moving of the grain into or out of the said bins. The bins will rest on posts 4 and beams 5 in the usual manner; but the height of the story below the bins need not be so great as would be required for spouting; and the usual high-top story above the bins may be dispensed with entirely, as each bin will have its separate receiving-pipe, which need only rise above the top of the bin a sufficient distance to fill that bin.

At some convenient location about the building there will be located a blower or air-forcing apparatus, 6, and from it will lead the blast-pipe 7 to any desired part of the building. The blast-pipe will be constructed near its eduction end for a distance of one or two feet, more or less, as shown in Figs. 5 and 6. This portion of the pipe will have a core, 8, concentric with the pipe 7, so as to form an annular opening, 9, which will form the blast passing through it into an annular sheet of air. The core 8 will be connected with the shell of its surrounding pipe by means of three or more radial wings, 10, which subdivide the airway 9 into as many passages as there are wings. These wings will preferably be formed in spiral shape about the core, so as to give to the passages between them a like conformation, for the purpose of producing a curvilinear direction to the annular blast 9, the better to envelop the moving column of grain that is to go forward with it.

The receiving-hopper 11 of the establishment may be placed in any desirable locality, and the pipe 12 will lead down from it, so as to allow the grain to start down through the pipe by means of gravity. The grain-pipe 12 just below the hopper 11 will receive, by a curved connection, the blast-pipe 7, which will deliver into the grain-pipe an annular blast through its openings 9. The grain, in falling into the air-blast, will fall into the interior of the blast in the central opening, initially formed by the core 8, and the spiral motion of the blast will cause it to fully envelop the entering column of grain, which will thereby be driven forward with sufficiently great force to carry it to a long distance in a lateral direction, or to a height sufficient to reach the tops of the bins. The pipe 12 will lead to a switch, 13, which is so constructed as to turn with its axle 14, and form connections with the vertical pipes 15, which rise to the tops of the bins, and discharge the grain into the said bins through curved elbows 16. The number of pipes 16 will correspond with the number of bins to be filled, one to each bin, and, as the switch 13 is at the bottom of the building, all the operative parts of the apparatus can be attended to on the lower or principal floor of the building. The axle 14 that turns the switch 13 to its connections with the different pipes rises through a stand, 17, to a sufficient height above the main floor to receive the hand-wheel 18 at a convenient position for a man to stand on the floor and use. The pipes 12 and 15 will preferably be placed below the principal floor, and an opening in the floor, directly over the swinging end of the switch-pipe, will enable the operator to see when the connections with 15 are properly made, and numbers on the ends of the pipes 15 will enable the operator at the wheel 18 to see just what bin he is sending the grain to.

The discharging-pipes 19 leading from the bottoms of the bins will be conveniently grouped in sets, and coupled with a small centering-hopper, 20, and also provided with suitable valves or gates 21, to control the flow of grain from any particular pipe into the receiving or centering hopper 20, from which centering-hopper the shipping-pipe 22 will lead to any desired place to discharge the grain from the building. A branch pipe, 23, may lead from the same blowing or air-forcing apparatus that is used for the receiving-pipes, and its connection with the shipping-pipe 22 will be similar to that already described for the receiving-pipes. A separate blower would, however, be used for the shipping-pipes in a large establishment; but if the same blower is used for both receiving and shipping, suitable cocks or valves 24 should be placed near the blower to direct the blast into the pipe 7 or 23, as desired.

Although this apparatus is especially adapted to beneficial use in a ventilated warehouse invented by myself, and described in a specification of even date herewith, it may readily be used in any building; but if so used, arrangement must be made at the top of the building for the free escape of the air from the top of the bins, so as not to cause a back pressure in the pipes, and also to provide means of escape for the quantity of dust set free by the operation.

It may be advisable in some instances to deliver the annular air-blast into the grain-pipe in rectilinear instead of in spiral lines.

Having described my invention, I claim—

1. The blast-pipe 7, when constructed with a concentric core, 8, and diverging wings 10, so as to form an annular blast delivered in curvilinear or rectilinear lines, substantially in the manner and for the purpose set forth.

2. The switch 13, for connecting the grain-receiving pipe 12 with the bin-pipes 15, substantially in the manner and for the purpose set forth.

MAHLON RANDOLPH.

Witnesses:
C. N. DAMAN,
ALEX. WHITE.